(12) United States Patent
Komatsu

(10) Patent No.: US 10,238,567 B2
(45) Date of Patent: Mar. 26, 2019

(54) ARM MECHANISM

(71) Applicants: Nobuo Komatsu, Nagano (JP); SYWIND CO., LTD., Nagano (JP)

(72) Inventor: Nobuo Komatsu, Nagano (JP)

(73) Assignee: SYWIND CO., LTD., Nagano (JP)

(*) Notice: Subject to any disclaimer, the term of this patent is extended or adjusted under 35 U.S.C. 154(b) by 0 days.

(21) Appl. No.: 15/663,538

(22) Filed: Jul. 28, 2017

(65) Prior Publication Data
US 2019/0029905 A1    Jan. 31, 2019

(51) Int. Cl.
| | |
|---|---|
| F16C 11/10 | (2006.01) |
| F16C 11/04 | (2006.01) |
| H04N 5/64 | (2006.01) |
| E04F 10/06 | (2006.01) |
| A61G 12/00 | (2006.01) |
| F16M 13/02 | (2006.01) |

(52) U.S. Cl.
CPC ............ *A61G 12/00* (2013.01); *F16M 13/02* (2013.01); *E04F 10/0611* (2013.01); *E04F 10/0618* (2013.01); *E04F 10/0622* (2013.01); *E04F 10/0651* (2013.01); *F16C 11/045* (2013.01); *F16M 2200/06* (2013.01)

(58) Field of Classification Search
CPC ............... E04F 10/0622; E04F 10/0611; E04F 10/0618; E04F 10/0651; F16M 13/02; F16M 2200/06; A61G 12/00; F16C 11/045

USPC ............... 248/284.1, 289.11, 291.1, 292.13; 160/70, 71, 79, 80
See application file for complete search history.

(56) References Cited

FOREIGN PATENT DOCUMENTS

| | | |
|---|---|---|
| JP | S36-010581 A | 5/1961 |
| JP | S40-004367 A | 2/1965 |
| JP | 2000-297897 A | 10/2000 |
| JP | 2008-76457 A | 4/2008 |
| JP | 2017150559 A * | 8/2017 |

OTHER PUBLICATIONS

Japanese Office Action for the related Japanese Patent Application No. 2016-032996 dated Dec. 18, 2018.

* cited by examiner

*Primary Examiner* — Tan Le
(74) *Attorney, Agent, or Firm* — Kenealy Vaidya LLP

(57) ABSTRACT

An arm mechanism includes a first arm, which is hollow, a second arm, and a connection portion for mutually rotatably connecting the first arm and the second arm. A connection portion 15 includes a rotary shaft extending in a direction perpendicular to an axial direction of a first arm 11 and a second arm 12, a friction portion for generating a frictional force against rotation of the rotary shaft, and a biasing member which is housed in the first arm, has an end portion facing away from the rotary shaft and connected to the first arm, has an end portion facing the rotary shaft and connected to the second arm via a connection member, and generates a contraction force which is increased with an increase in angle between an axis of the second arm and an axis of the first arm by rotation of the rotary shaft.

19 Claims, 15 Drawing Sheets

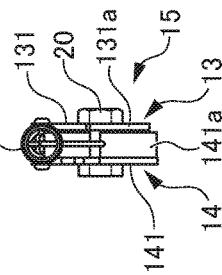
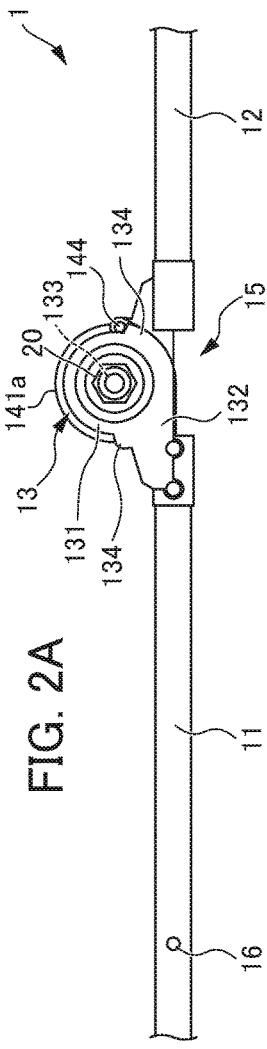
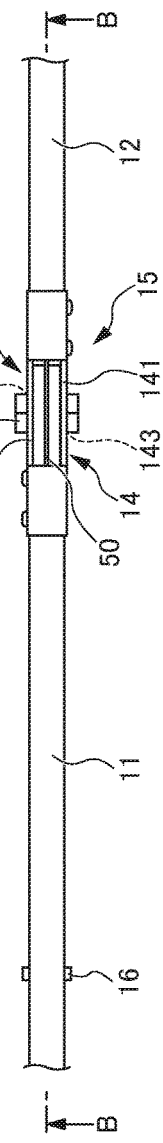
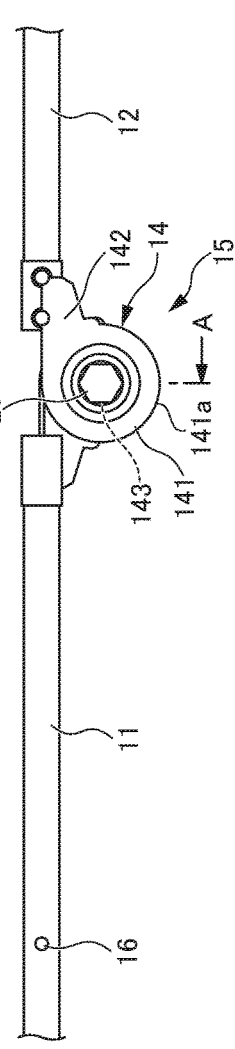

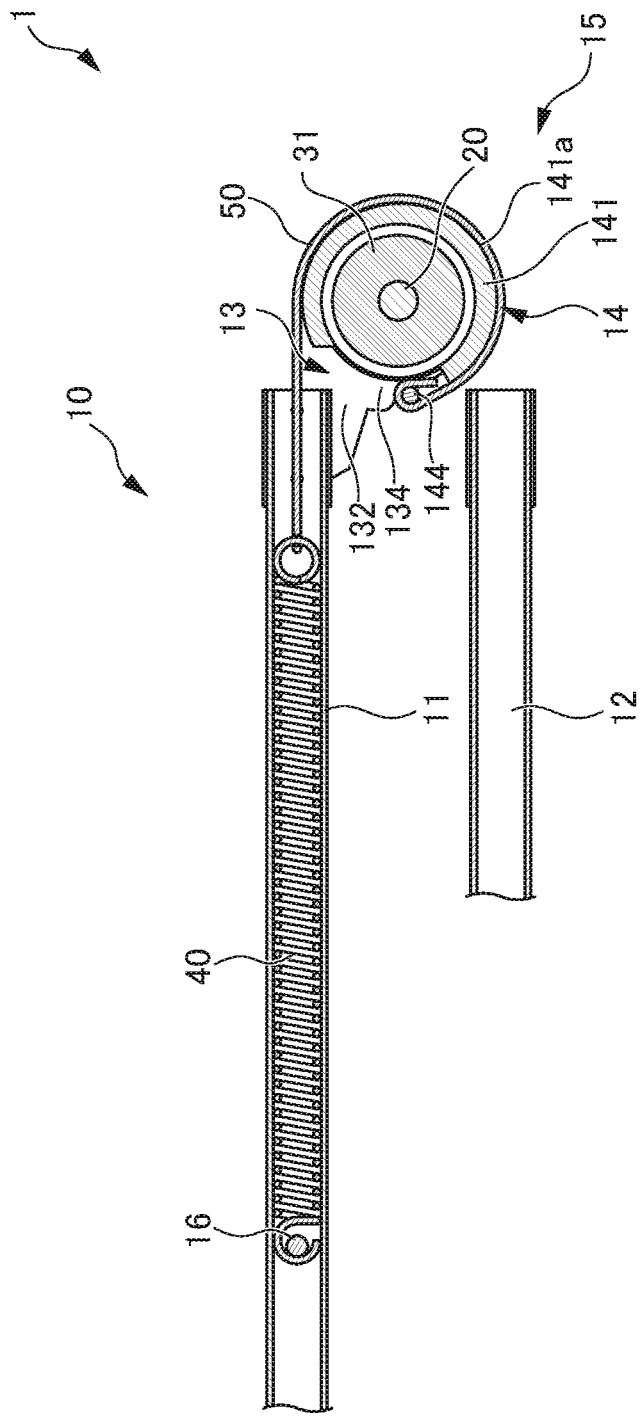

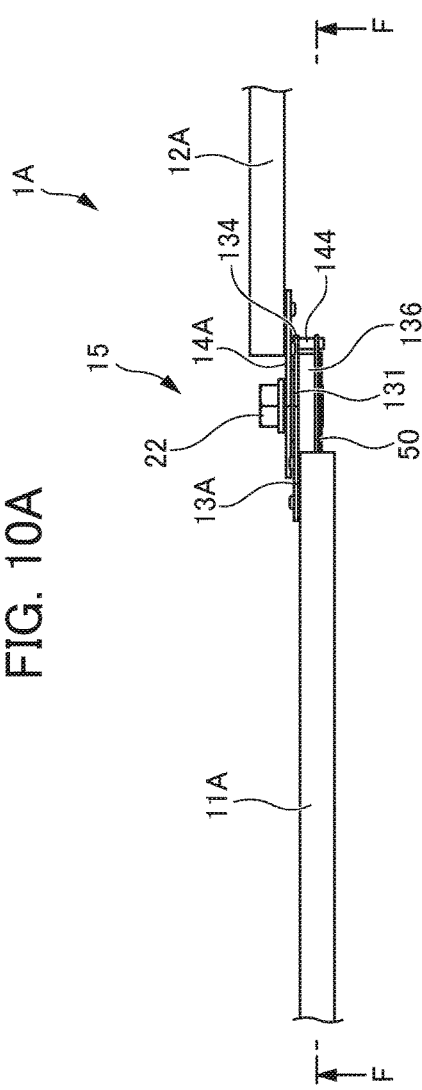
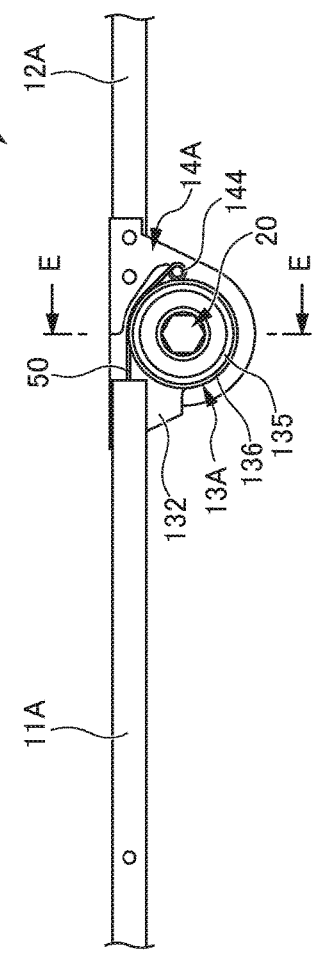
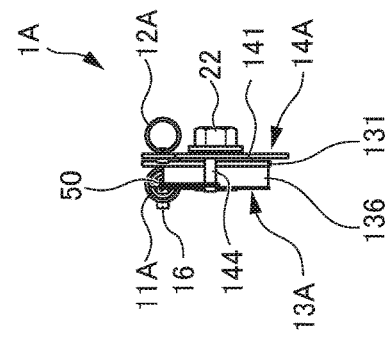

ARM MECHANISM

BACKGROUND OF THE INVENTION

Field of the Invention

The present invention relates to an arm mechanism.

Related Art

Conventionally, there have been cases in which a medical professional carries out work that requires a free change of position of a wide variety of equipment, including carrying out work while watching a display, e.g., at a medical site. In such cases, it is known that an arm mechanism called a free-stop arm is used. This arm mechanism is a mechanism capable of bending an arm, which is provided with equipment, at various angles and maintaining the angles. Patent Document 1 discloses an arm mechanism formed of a link mechanism with four-joint links in which tension springs are held with two rectangular plate-shaped bodies and link shafts are arranged at end portions of the plate-shaped bodies.

Inside the link mechanism, the tension springs are arranged along the longitudinal direction of the plate-shaped bodies. The tension springs are connected to the link shafts, which are arranged along the lateral direction of the plate-shaped bodies. The link shafts are provided with friction mechanisms and are coupled to a display. Thus, when the display is rotated about the link shafts, the force of the springs acts in the opposite direction with respect to the rotation of the display to provide balancing, and the display is stopped at a desired position by the friction mechanisms.

Patent Document 1: Japanese Unexamined Patent Application, Publication No. 2008-76457

SUMMARY OF THE INVENTION

However, when a link mechanism is formed of four-joint links, the arm is large and the structure is complicated, thereby interfering with downsizing. In addition, a conventional downsized arm mechanism uses a friction mechanism only or uses a locking mechanism. Therefore, this arm mechanism is incapable of bending at a free position and is clumsy to use.

It is an object of the present invention to provide an arm mechanism having a downsized shape and which is capable of bending at various angles and maintaining the angles without using a complicated mechanism.

The present invention for achieving the aforementioned object provides an arm mechanism including a first arm, which is hollow, a second arm made of a pipe material, and a connection portion for mutually rotatably connecting the first arm and the second arm, the connection portion including a rotary shaft extending in a direction perpendicular to an axial direction of the first arm and the second arm, a friction portion for generating a frictional force against rotation of the rotary shaft, and a biasing member which is housed in the first arm, has an end portion facing away from the rotary shaft and connected to the first arm, an end portion facing the rotary shaft and connected to the second arm via a connection member, and generates a contraction force which is increased with an increase in angle between an axis of the second arm and an axis of the first arm by rotation of the rotary shaft.

It is preferable that the connection portion includes a first plate and a second plate connected to the first arm and the second arm, respectively, the first and second plates are pivotally supported by the rotary shaft, the friction portion includes a friction plate, and the friction plate is sandwiched by the first plate and the second plate.

It is preferable that the first plate or the second plate has an outer peripheral surface along a circumferential direction of the rotary shaft, and one end portion of the connection member is mounted along the outer peripheral surface.

It is preferable that the biasing member is a tension spring.

It is preferable that the biasing member is a gas spring mounted in the first arm and the connection member is pulled toward an end portion of the first arm facing away from the rotary shaft.

According to the present invention, an arm mechanism having a downsized shape and which is capable of bending at various angles and maintaining the angles without using a complicated mechanism can be provided.

BRIEF DESCRIPTION OF THE DRAWINGS

FIGS. 2A to 2D are views illustrating the arm mechanism of the first embodiment, in which FIG. 2A is a rear view, FIG. 2B is a plan view, FIG. 2C is a front view, and FIG. 2D is a side view viewed from the right side of FIGS. 2A to 2D;

FIG. 6A to 6C illustrate the arm mechanism in a use state according to the first embodiment, in which FIG. 6A is a plan view, FIG. 6B is a front view, and FIG. 6C is a side view;

FIG. 7 is a cross-sectional view cut along line C-C of FIG. 6A;

FIG. 10A to 10C are views illustrating the arm mechanism of the second embodiment, in which FIG. 10A is a plan view, FIG. 10B is a front view, and FIG. 10C is a side view;

DETAILED DESCRIPTION OF THE INVENTION

First Embodiment

Figure 1:
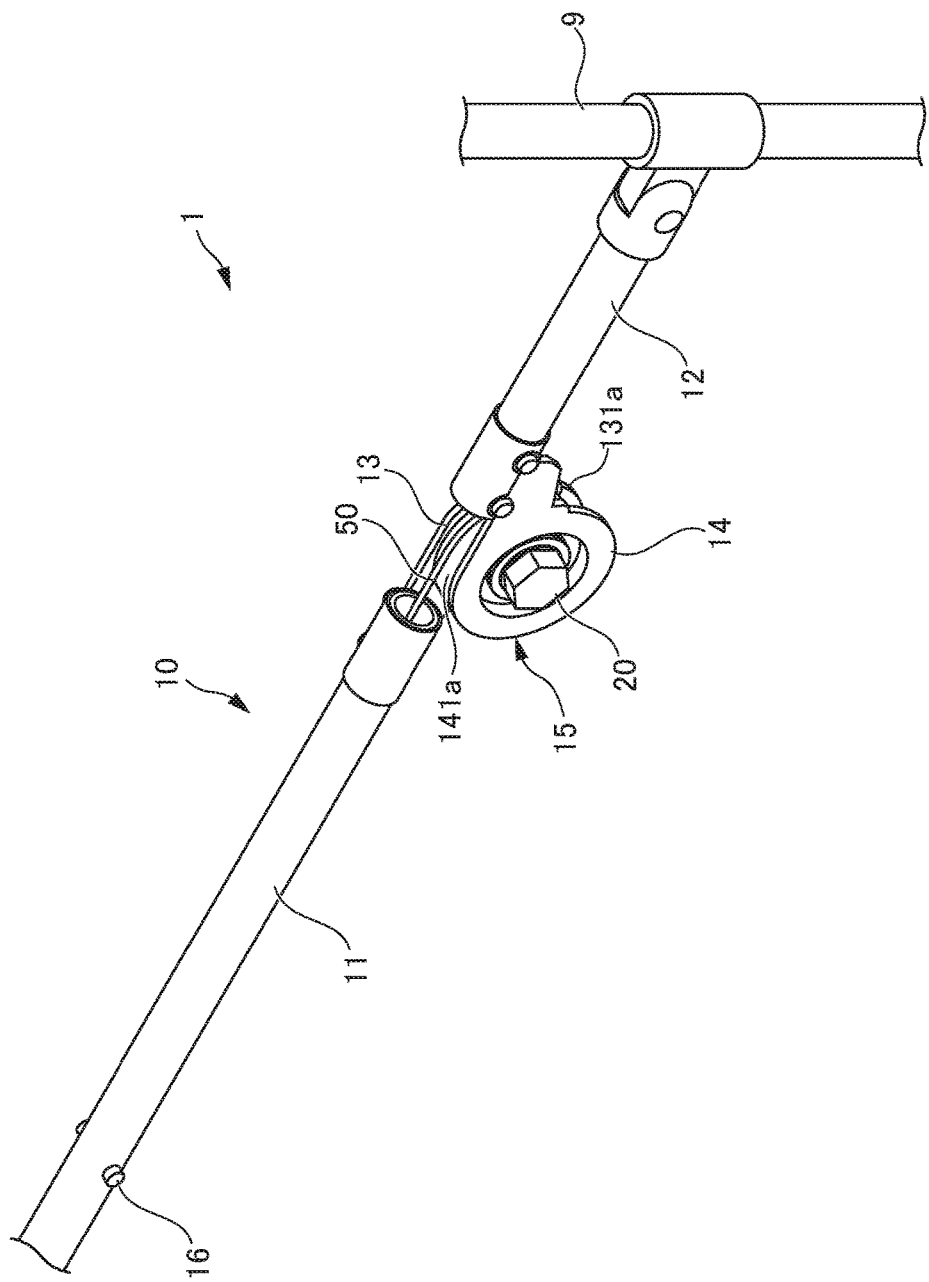
FIG. 1 is a perspective view illustrating an arm mechanism according to a first embodiment of the present invention.

Embodiments of the present invention are described in detail below with reference to the drawings. FIG. 1 is a perspective view illustrating an arm mechanism 1 according to the first embodiment of the present invention. The arm mechanism 1 is an arm capable of being bent to freely change the position of equipment during work, for example, with one end portion being supported on a support portion 9, e.g., a strut, while the other end portion is mounted on any equipment (not illustrated), e.g., a stand, for supporting a display or the like. Herein, the root side of the arm mechanism 1 mounted on the support portion 9 is called the proximal end side, and the side on which the equipment is mounted is called the distal end side.

The arm mechanism 1 includes an arm portion 10 and a connection portion 15. The arm portion 10 includes a first arm 11 and a second arm 12. The first arm 11 is formed of a pipe material having a hollow interior. When the arm mechanism 1 is in use, the first arm 11 is the side on which the equipment is mounted and one end portion constitutes the distal end side of the arm mechanism 1. The distal end side of the first arm 11 is formed with a hole, into which a mounting shaft 16 penetrating in a diametrical direction of the pipe and mounting a tension spring 40 to be described later is press-fitted and fixed. The second arm 12 is formed of a pipe material having a hollow interior. However, the second arm 12 does not have to be formed of a hollow pipe material. When the arm mechanism 1 is in use, the second arm 12 is a side mounted on the support portion 9, and one end portion is positioned on the proximal end side of the first arm 11 and the other end portion is mounted on the support portion 9. The first arm 11 and the second arm 12 are made of a pipe material having a cylindrical shape, but a pipe material having a different shape, e.g., a square shape, may be used. In addition, the second arm 12 does not have to be hollow because the tension spring 40 is not mounted. The first arm 11 and the second arm 12 are of the same shape, but may be of different shapes.

Figure 3:
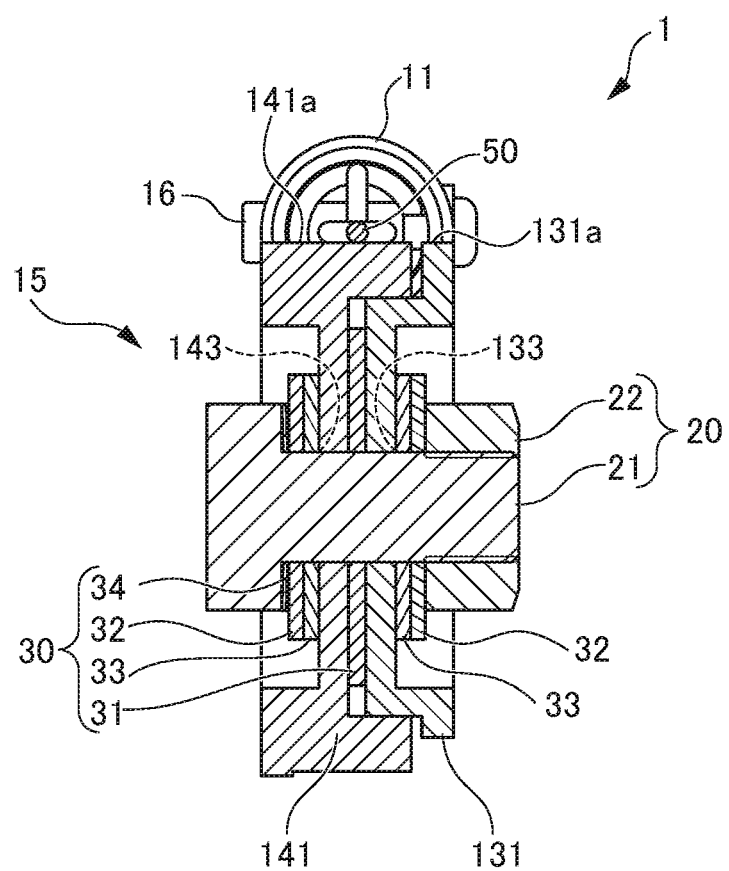
FIG. 3 is a cross-sectional view cut along line A-A of FIG. 2C.

FIG. 2A is a rear view (view of a side not indicated in FIG. 1) of the arm mechanism 1, and FIG. 2C is a front view (a side indicated in FIG. 1). FIG. 2B is a plan view of the arm mechanism, and FIG. 2D is a side view viewed from the right side of FIGS. 2A to 2D. FIG. 3 is a cross-sectional view cut along line A-A of FIG. 2C.

As illustrated in FIGS. 2A to 2D, the first arm 11 and the second arm 12 are connected by the connection portion 15. The connection portion 15 includes a first metal plate 13, a second metal plate 14, a rotary shaft 20, a friction portion 30 (see FIG. 3), and the tension spring 40, which is a biasing member (see FIG. 4). The connection portion 15 also includes a wire 50, which is a connection member. The connection member may be a belt. Although not illustrated for the sake of convenience of explanation, the connection portion 15 is properly covered with a cover for prevention of dust adherence or for increase in operability. The first and second metal plates are first and second plates, respectively. The material of the first and second plates is not limited to metal, but may be plastic.

The first metal plate 13 is a plate secured with a screw to the first arm 11 (see FIG. 2B). As illustrated in FIG. 2A, the first metal plate 13 includes an approximately circular surface 131, an extension portion 132 extending outward from the end edge of the approximately circular surface 131, a hole 133 formed through the approximately circular surface 131, and a stopper 134.

The approximately circular surface 131 has a shape in which the upper-side (arm portion 10 side) semicircle and the lower-side semicircle are different in diameter when the first metal plate 13 is in a state of being mounted on the first arm 11 such that the lower-side semicircle has a smaller diameter than the upper-side semicircle. The approximately circular surface 131 has an outer peripheral surface 131a along the circumferential direction of the rotary shaft 20 to be described later.

The extension portion 132 includes a straight portion extending horizontally from an upper-side end portion of the approximately circular surface 131 to the proximal end side of the first arm 11. The extension portion 132 is secured with a screw to an end portion of the proximal end side of the first arm 11. The hole 133 is arranged roughly centrally through the approximately circular surface 131.

The stopper 134 is formed of a step formed by the difference in diameter between the upper-side semicircular and the lower-side semicircular of the approximately circular surface 131.

As illustrated in FIG. 2B, the second metal plate 14 and the first metal plate 13 are arranged in alternate directions. The second metal plate 14 is a plate secured with a screw to the second arm 12. As illustrated in FIG. 2C, the second metal plate 14 includes an approximately circular surface 141, an extension portion 142 extending outward from the end edge of the approximately circular surface 141, a hole 143 formed through the approximately circular surface 141, and a boss 144 (see FIG. 2A).

The approximately circular surface 141 includes an outer peripheral surface 141a along the circumferential direction of the rotary shaft 20 to be described later. As illustrated in FIG. 3, the outer peripheral surface 141a of the second metal plate 14 is formed to be thicker than the first metal plate 13. The center in the thickness direction of the connection portion 15, which is formed of a combination of the first metal plate 13 and the second metal plate 14, passes over the outer peripheral surface 141a of the second metal plate 14. In a state where the first metal plate 13 and the second metal plate 14 face each other, the lower end of the approximately circular surface 141 of the second metal plate 14 is positioned below the lower end of the approximately circular surface 131 of the first metal plate 13.

Returning to FIG. 2C, the extension portion 142 includes a straight portion extending roughly horizontally from an upper-side end portion of the approximately circular surface 141 to the distal end side of the second arm 12 The extension portion 142 is secured with a screw to an end portion of the distal end side of the second arm 12. The extension portion 142 is arranged to have the same height as the straight portion of the extension portion 132 of the first metal plate 13.

The hole 143 is arranged roughly centrally through the approximately circular surface 141. The hole 133 of the first metal plate 13 and the hole 143 of the second metal plate 14 are arranged such that the holes 133, 143 are coaxial with the straight portions of the extension portions 132, 142 being at the same height.

As illustrated in FIG. 2A, the boss 144 is a projection that is formed on a boundary portion between the approximately circular surface 141 and the extension portion 142 of the second metal plate 14, and is protruded toward the first metal plate 13. The boss 144 formed on the second metal plate 14 is arranged in a position that the boss 144 comes into contact with the stopper 134 of the first metal plate 13.

As illustrated in FIG. 3, the rotary shaft 20 is formed of a bolt 21 and a nut 22. The shaft portion of the bolt 21 is extended in a direction perpendicular to the approximately circular surfaces 131, 141 of the first metal plate 13 and the second metal plate 14. The bolt 21 of the rotary shaft 20 is inserted into the holes 133, 143 of the first metal plate 13 and the second metal plate 14, and the first metal plate 13 and the second metal plate 14 are fastened with the bolt 21 and the nut 22 and are pivotally supported. The rotary shaft 20 is extended in a direction perpendicular to the tube axial direction of the first arm 11 and the second arm 12, and rotatably connects the second arm 12 and the first arm 11. The tube axial direction corresponds to the axial direction and is a direction parallel to the longitudinal direction of the first arm 11 and the second arm 12.

The friction portion 30 is provided around the rotary shaft 20 and, as illustrated in FIG. 3, includes a friction plate 31, plain washers 32, slide washers 33, and a disc spring 34, which are arranged coaxially with respect to the rotary shaft 20. The friction plate 31 is a roughly disc-shaped plate with bumps and dents to be sandwiched between the first metal plate 13 and the second metal plate 14, and is coaxially rotatable with respect to the rotary shaft 20. The friction plate 31 generates friction against the rotation of the rotary shaft 20 when the first arm 11 and the second arm 12 are mutually rotated. The plain washer 32 is a washer, and the slide washer 33 is a washer with bumps and dents. The slide washer 33 may not be one which makes the nut 22 hard to loosen. The disc spring 34, when the nut 22 is fastened, applies a force in the axial direction of the rotary shaft 20 and generates a friction torque.

Figure 4:
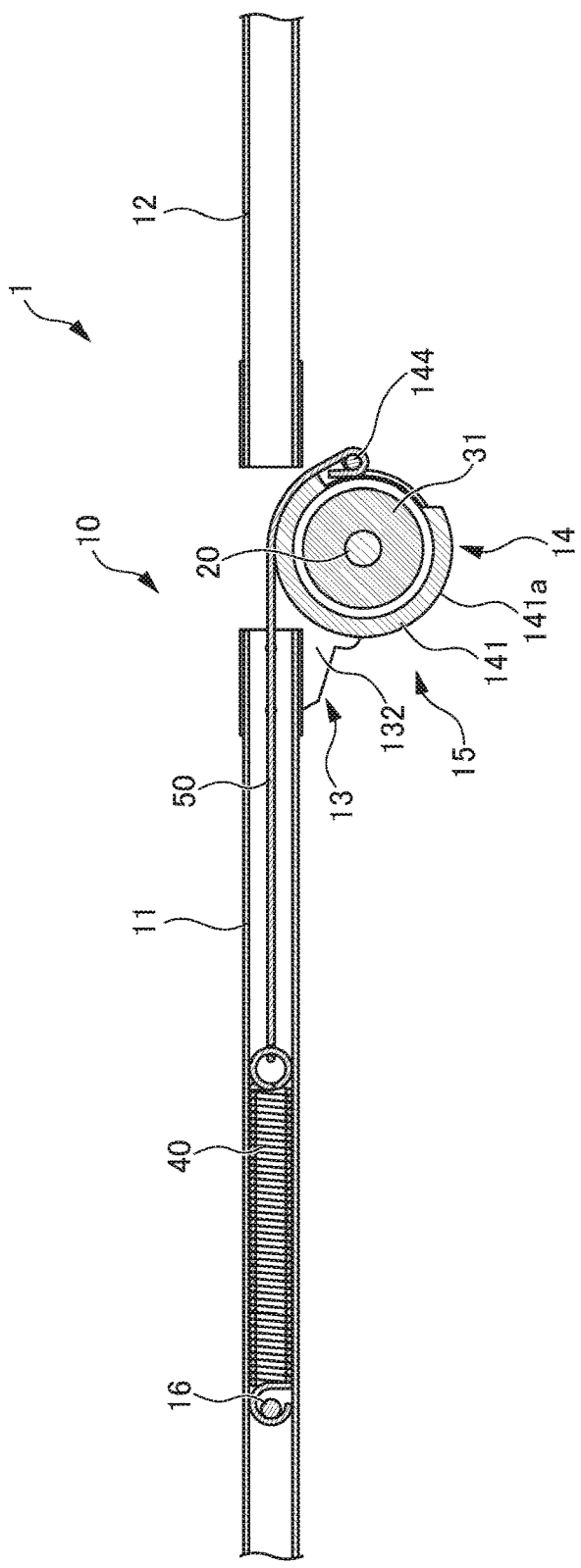
FIG. 4 is a cross-sectional view cut along line B-B of FIG. 2B.

FIG. 4 is a cross-sectional view cut along line B-B of FIG. 2B. The first embodiment uses the tension spring 40, which is a biasing member. As illustrated in FIG. 4, the tension spring 40 is housed in the first arm 11 since the outside diameter of the coiled portion is smaller than the inside diameter of the first arm 11. The tension spring 40 is connected to the first arm 11 such that one end portion (an end portion facing away from the rotary shaft 20) is caught on the mounting shaft 16, which is provided on the distal end side of the first arm 11. The other end portion (an end portion facing the rotary shaft 20) of the tension spring 40 is connected to the wire 50.

The wire 50 is a stainless steel wire. The wire 50 is arranged such that one end portion is connected to the end portion on the proximal end side of the tension spring 40 and passes through the central axis of the first arm 11. The wire 50 is mounted along the outer peripheral surface 141a of the second metal plate 14 from the proximal end of the first arm 11. The other end portion of the wire 50 is bent to be capable of being caught on the boss 144, which protrudes to the back side (first metal plate 13 side) of the second metal plate 14. The bent portion is put on the boss 144 so that the other end portion of the wire 50 is mounted on the second metal plate 14.

Figure 5:
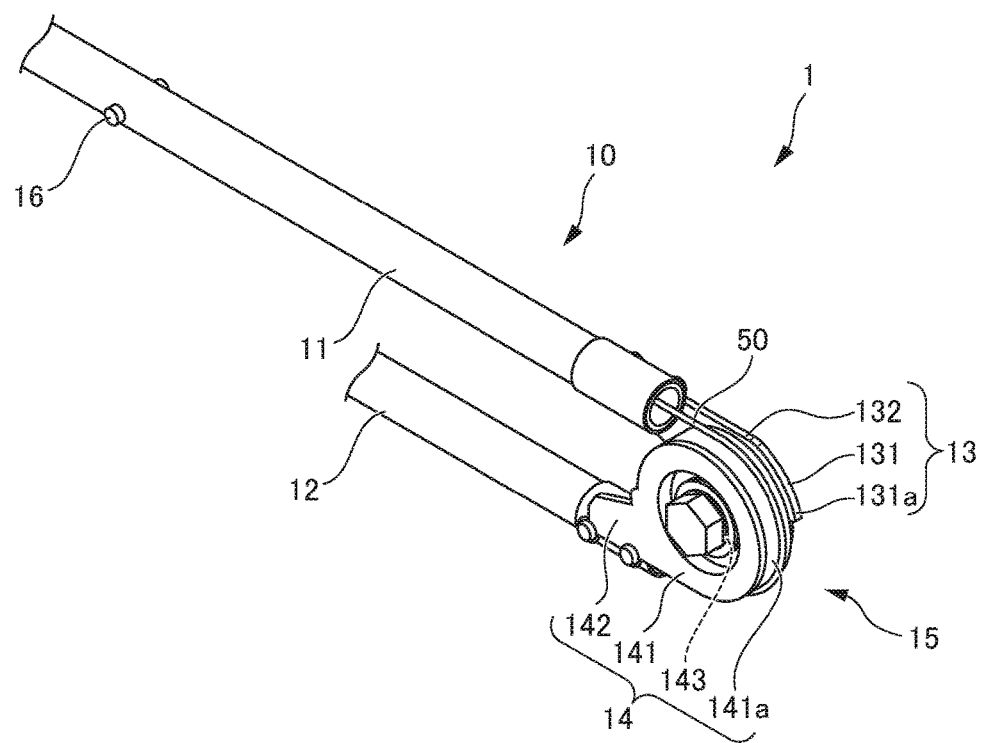
FIG. 5 is a perspective view illustrating a use state of the arm mechanism according to the first embodiment.
Figure 6A:
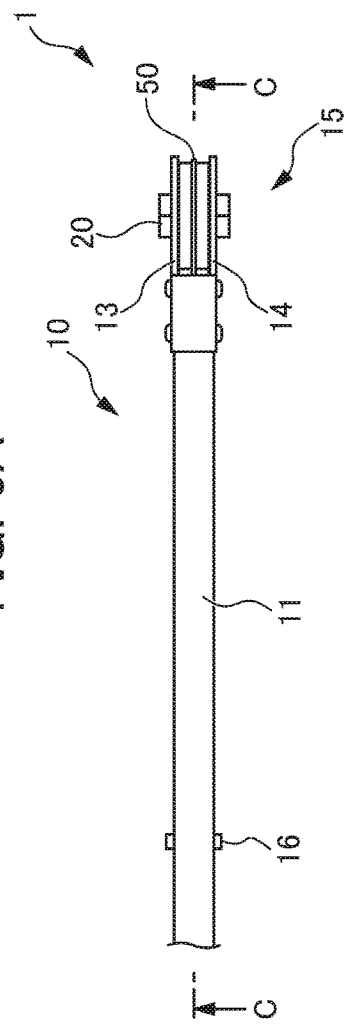
Figure 6C:
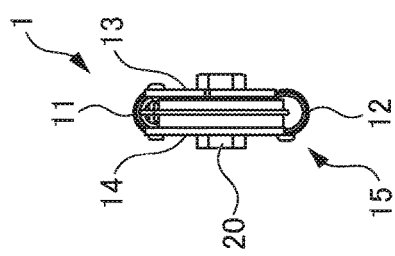

FIG. 5 is a perspective view illustrating a use state of the arm mechanism 1. FIG. 6A is a plan view of a use state of the arm mechanism 1, FIG. 6B is a front view, and FIG. 6C is a side view viewed from the right side of FIGS. 6A to 6C.

FIGS. 5 and 6A to 6C are views illustrating a state where the arm mechanism 1 has been folded and the second arm 12 has been rotated 180 degrees from a state where the first arm 11 and the second arm 12 are aligned in a straight fashion as illustrated in FIG. 1. It is not suggested that the arm mechanism 1 is always used in the folded state illustrated in FIGS. 5 and 6A to 6C. The arm mechanism 1 may be bent at a desired position between the state of FIG. 1 and the state of FIG. 5, and maintain the orientation.

Figure 6B:
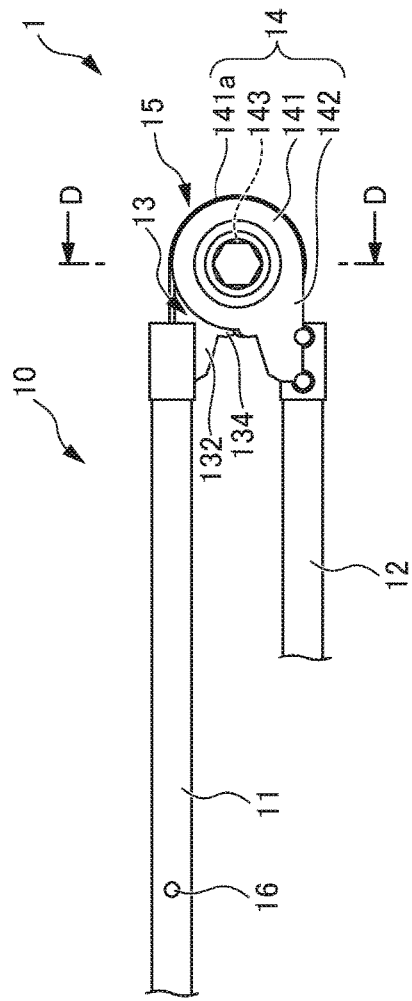
Figure 8:
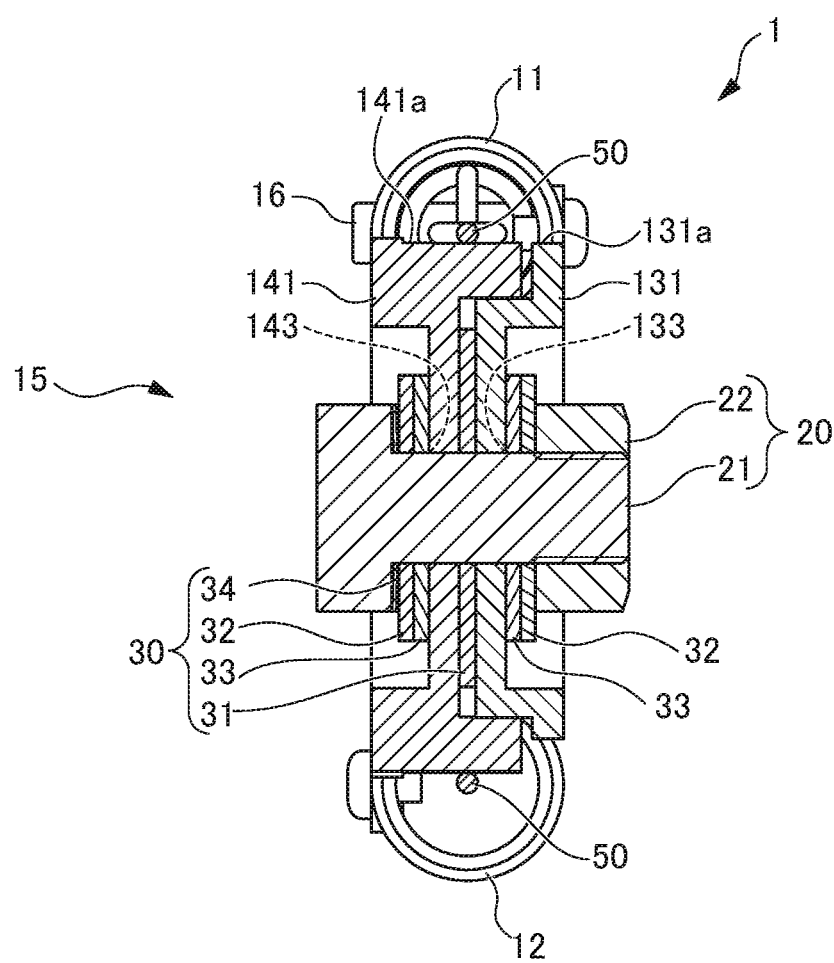
FIG. 8 is a cross-sectional view cut along line D-D of FIG. 6B.

FIG. 7 is a cross-sectional view cut along line C-C of FIG. 6A, and FIG. 8 is a cross-sectional view cut along line D-D of FIG. 6B. The outer peripheral surfaces 131a, 141a of the approximately circular surfaces 131, 141 of the first metal plate 13 and the second metal plate 14 follow the circumferential direction of the rotary shaft 20. As illustrated in FIG. 7, when the connection portion 15 is rotated in the clockwise direction to increase the angle between the tube axis of the second arm 12 and the tube axis of the first arm 11, the wire 50 is wound around the outer peripheral surface 141a (drum portion) of the second metal plate 14 of the connection portion 15. Because the wire 50 is moved rightward in FIG. 7, i.e., toward the second arm 12, the tension spring 40 is pulled and generates torque leftward in FIG. 7, i.e., toward the distal end side of the first arm 11. Thus, torque causing rotation in the counterclockwise direction is applied to the first arm 11.

The connection portion 15 includes the friction portion 30. The friction portion 30 generates a frictional force against the rotation of the rotary shaft 20. More specifically, because the friction plate 31 is arranged between the first metal plate 13 and the second metal plate 14, the first metal plate 13 and the second metal plate 14 are rotated in a state where friction occurs with respect to the rotary shaft 20.

Thus, because of the counterclockwise torque applied to the first arm 11 and the friction against the rotary shaft 20, when the arm mechanism 1 is folded, the first arm 11 or the second arm 12 is stopped at a desired position and the stopped state is maintained.

The boss 144 provided on the second metal plate 14 comes into contact with the stopper 134 in a state where the first arm 11 and the second arm 12 are coupled in a straight extended fashion as illustrated in FIG. 2A and in the folded state illustrated in FIG. 7. Thus, the stopper 134 provided on the first metal plate 13 restricts the angle of rotation of the second metal plate 14.

According to the first embodiment, the following effect is provided. In the first embodiment, the arm mechanism 1 is configured to include the first arm 11 made of a pipe material, the second arm 12 made of a pipe material, and the connection portion 15 for mutually rotatably connecting the first arm and the second arm. In addition, the second arm 12 is rotatably connected to the first arm 11 with the connection portion 15 by means of the rotary shaft 20, which is extended in a direction perpendicular to the tube axial direction of the first arm 11 and the second arm 12. In addition, the connection portion 15 is configured to include the rotary shaft 20, the friction portion 30 for generating a frictional force against the rotation of the rotary shaft 20, and the tension spring 40, which is housed in the first arm 11, has an end portion facing away from the rotary shaft 20 and connected to the first arm 11, an end portion facing the rotary shaft 20 and connected to the second arm 12 via the wire 50, and generates a contraction force which is increased with an increase in the angle between the tube axis of the second arm 12 and the tube axis of the first arm 11 by the rotation of the rotary shaft 20.

According to the first embodiment, when the inclination angle between the first arm 11 and the second arm 12 is changed as the rotary shaft 20 provided on the connection portion 15 is rotated, the force causing contraction of the tension spring 40 is increased with an increase in the angle between the tube axis of the second arm 12 and the tube axis of the first arm 11. The rotation of the rotary shaft 20 is stopped by the connection portion 15 when the rotary force of the rotary shaft 20 and the tension force of the tension spring 40 are applied to the wire 50 in a balanced state because of the friction portion 30. Thus, the angle of the tube axes of the first arm 11 and the second arm 12 can be freely changed, and the arm mechanism 1 can be maintained in a state of being bent at a desired angle. Thus, when the wire 50 is connected to the tension spring 40, which is housed in the first arm 11, the arm mechanism 1 can be bent at a desired position and the free-stop effect of enabling an inclined angle to be maintained can be provided. As a result, the arm mechanism 1 having a downsized shape can be formed without use of a complicated mechanism.

In addition, in the first embodiment, the connection portion 15 is configured such that the first metal plate 13 and the second metal plate 14 connected to the first arm 11 and the second arm 12, respectively, are pivotally supported by the rotary shaft 20 so that the second arm 12 is rotatably connected to the first arm 11. Furthermore, the friction portion 30 generates a frictional force against the rotation of the rotary shaft 20 as the friction plate 31 is sandwiched by the first metal plate 13 and the second metal plate 14. Thus, the frictional force against the rotation of the rotary shaft 20 is preferably transmitted to the wire 50 and the tension spring 40 via the wire 50. Accordingly, the same effect as above can be provided.

In addition, in the first embodiment, the second metal plate 14 has the outer peripheral surface 141a along the circumferential direction of the rotary shaft 20, and one end portion of the wire 50 is mounted along the outer peripheral surface 141a. Thus, the frictional force against the rotation of the rotary shaft 20 is easily transmitted to the wire 50, which is connected to the tension spring 40, and the same effect as above can be provided.

In addition, in the first embodiment, a biasing member is formed of the tension spring 40. Thus, the biasing member is easily mounted in the first arm 11, which is a pipe.

Second Embodiment

Next, an arm mechanism of the second embodiment of the present invention is described. In the description of the second embodiment onwards, only configurations different from those of the first embodiment are described, and matters not particularly described are the same as the configurations of the first embodiment. In addition, the same elements as the first embodiment are described with use of the same reference numerals as the first embodiment.

Figure 9:
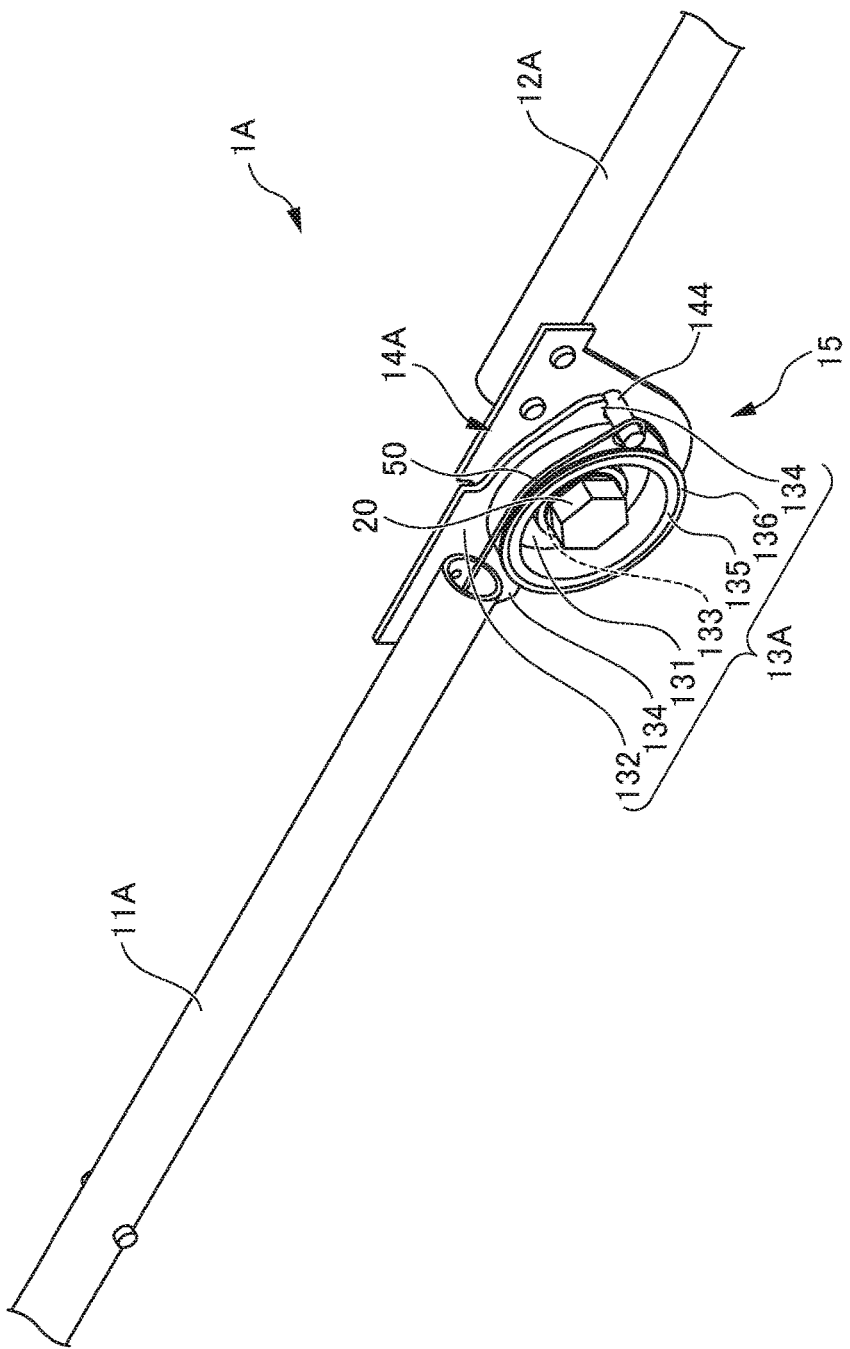
FIG. 9 is a perspective view illustrating an arm mechanism according to a second embodiment of the present invention.
Figure 11:
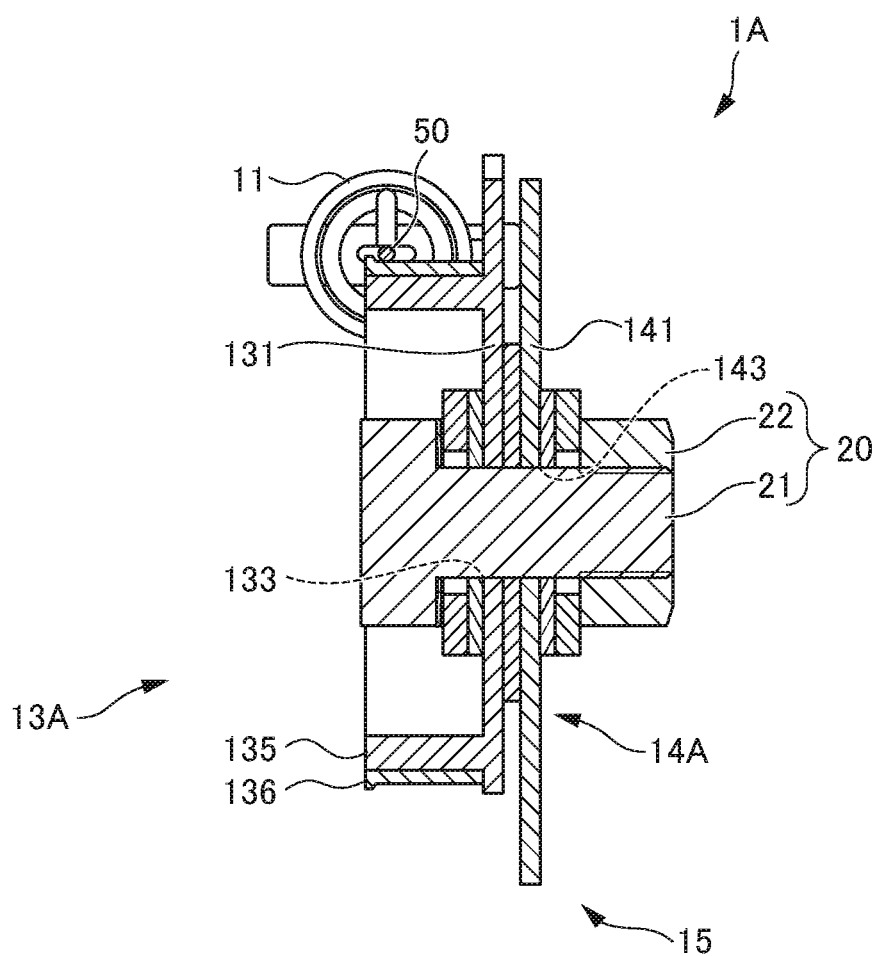
FIG. 11 is a cross-sectional view cut along line E-E of FIG. 10B.
Figure 12:
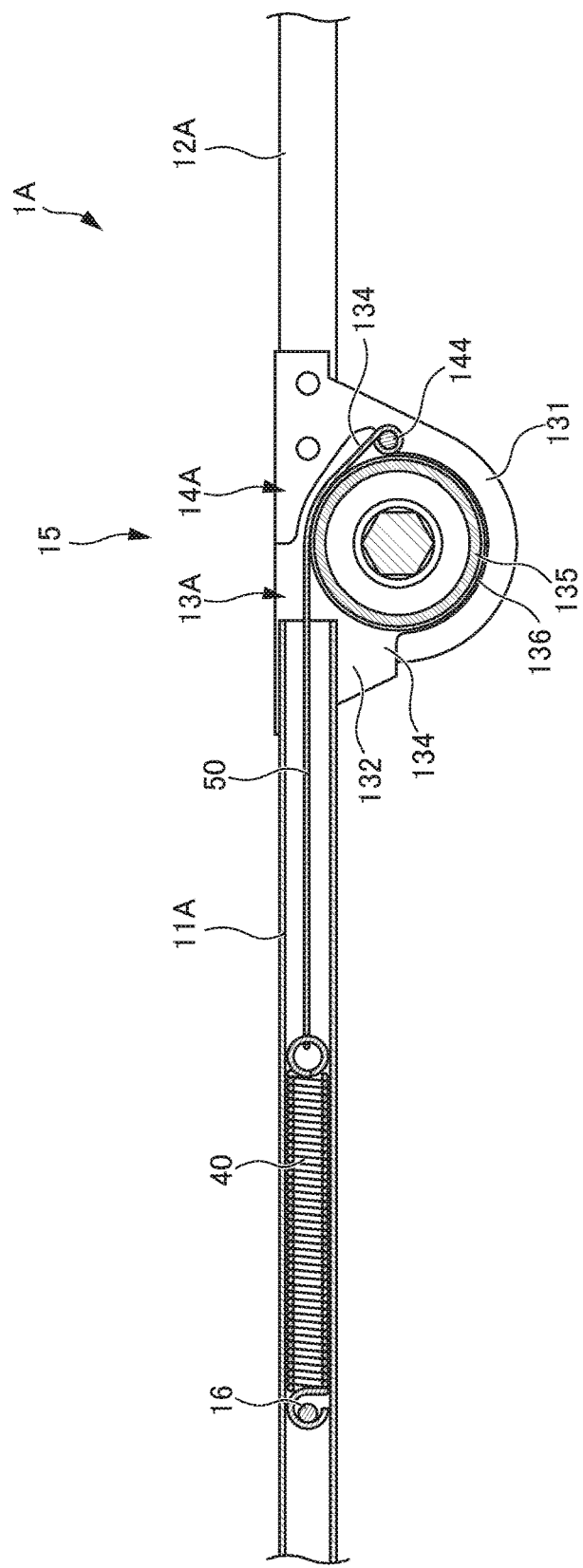
FIG. 12 is a cross-sectional view cut along line F-F of FIG. 10A.

FIG. 9 is a perspective view illustrating an arm mechanism 1A according to the second embodiment. FIG. 10A is a plan view of the arm mechanism 1A, FIG. 10B is a front view (the side indicated in FIG. 9), and FIG. 10C is a side view viewed from the right side of FIGS. 10A to 10C. FIG. 11 is a cross-sectional view cut along line E-E of FIG. 10B, and FIG. 12 is a cross-sectional view cut along line F-F of FIG. 10A.

As illustrated in FIG. 9, the second embodiment differs from the first embodiment in that a first arm 11A and a second arm 12A are not aligned on the same axis, but are arranged in a displaced manner, and in terms of the configurations of a first metal plate 13A and a second metal plate 14A.

In the second embodiment, a plate connected to the first arm 11A is called the first metal plate 13A and a plate connected to the second arm 12A is called the second metal plate 14A.

As illustrated in FIG. 10C, the second metal plate 14A has a plane shape and includes the approximately circular surface 141 with a diameter greater than that of the first metal plate 13A.

As illustrated in FIG. 11, the first metal plate 13A includes a cylindrical portion 135 and a ring portion 136 constituting an outer peripheral surface, in addition to the approximately circular surface 131, the extension portion 132, and the hole 133.

The cylindrical portion 135 is a cylindrical portion that is arranged on the approximately circular surface 131 and is erected in the thickness direction of the approximately circular surface 131. The cylindrical portion 135 is arranged coaxially with respect to the hole 133 and on a slightly inner side from the outside diameter of the lower-side semicircle of the approximately circular surface 131.

The ring portion 136 is an annular member arranged on an outer side of the cylindrical portion 135 and is fitted to the cylindrical portion 135.

As illustrated in FIG. 12, according to the second embodiment, the wire 50 comes into contact with the surface of the ring portion 136 and is mounted by being put on the boss 144, which protrudes from the second metal plate 14A.

The second embodiment provides the same effect as the first embodiment and facilitates mounting of the first metal plate 13A and the second metal plate 14A. In addition, the second embodiment enables an increase in the range of rotation of the arm portion 10 (connection portion 15).

Third Embodiment

Figure 13:
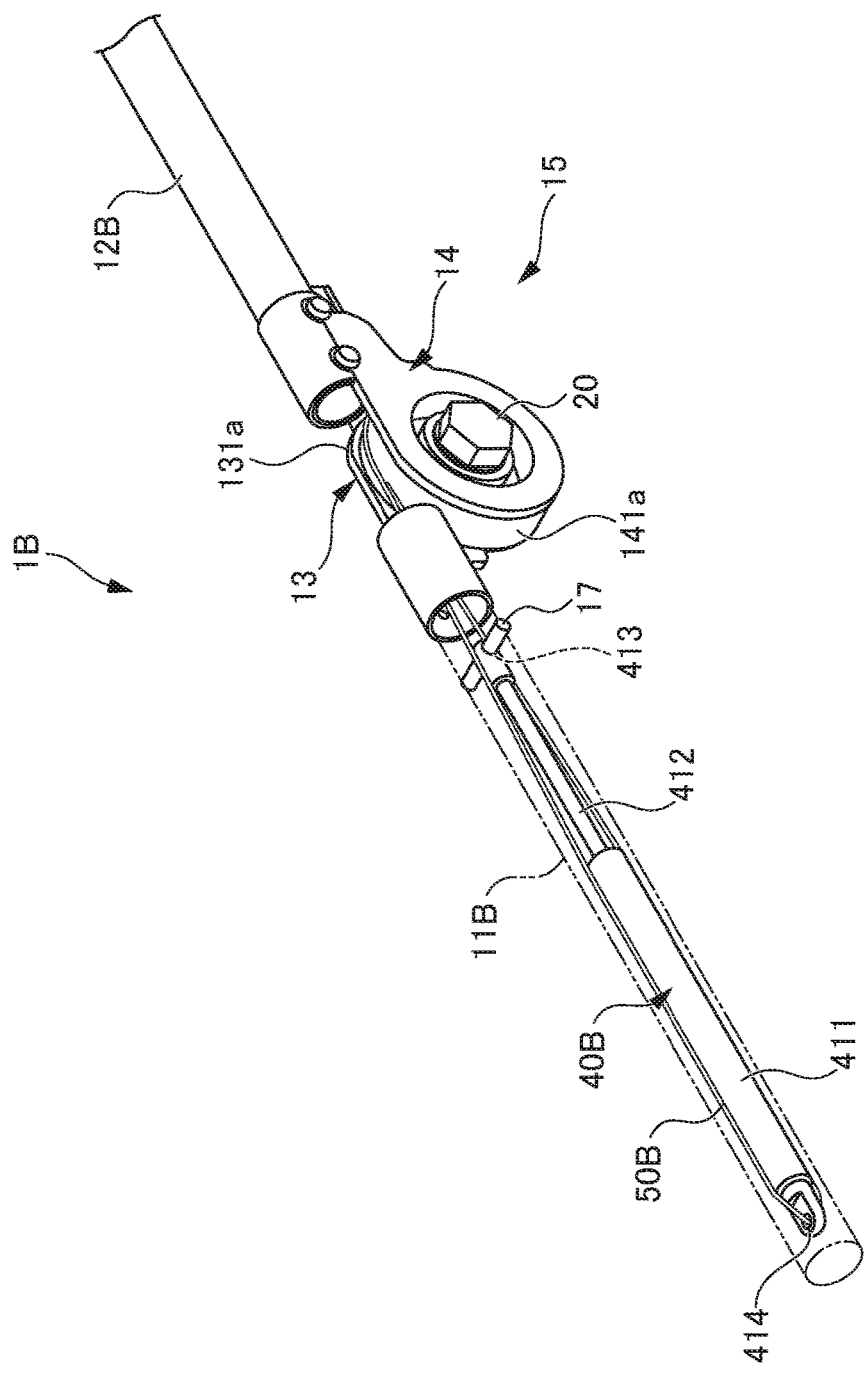
FIG. 13 is a perspective view illustrating an arm mechanism according to a third embodiment of the present invention.
Figure 14:
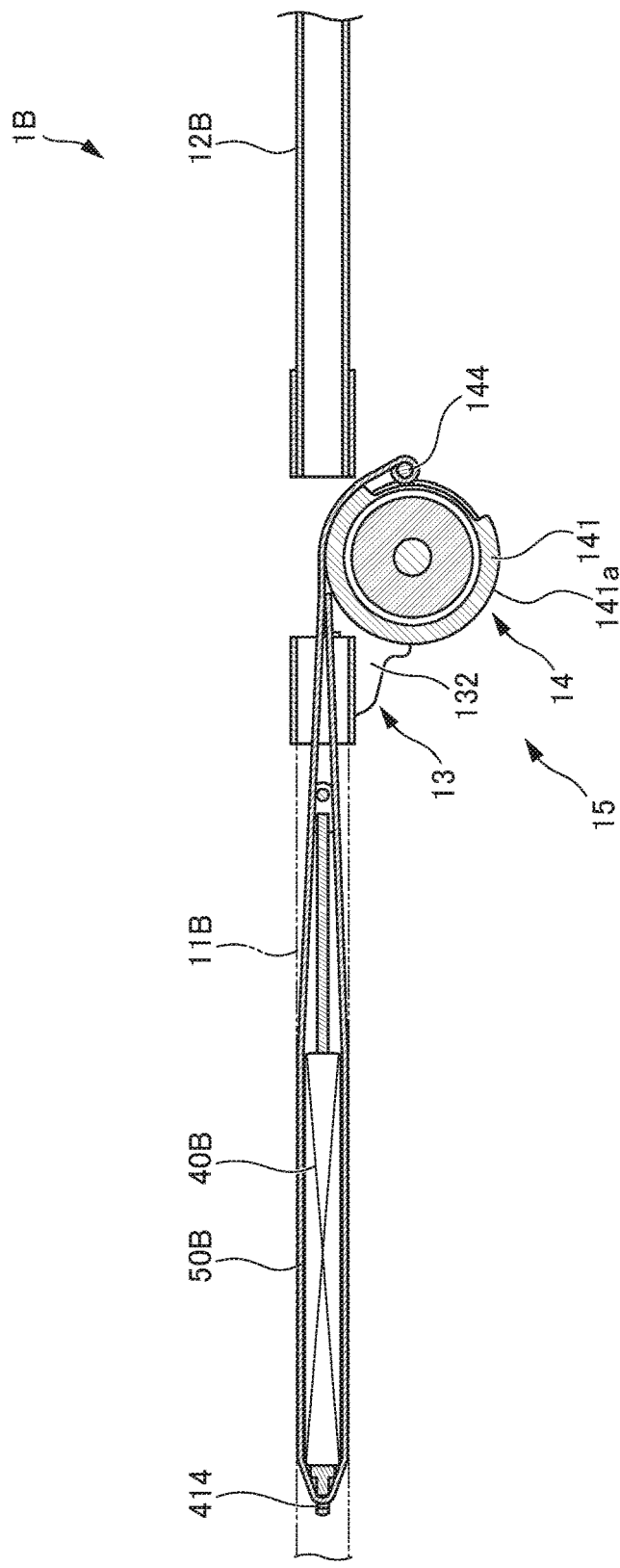
FIG. 14 is a cross-sectional view of the arm mechanism according to the third embodiment.

Next, the third embodiment of the present invention is described. FIG. 13 is a perspective view illustrating an arm mechanism 1B according to the third embodiment. FIG. 14 is a cross-sectional view of the arm mechanism 1B. As illustrated in FIGS. 13 and 14, the arm mechanism 1B according to the third embodiment differs from that of the first embodiment in that a gas spring 40B, as a biasing member, is arranged in a first arm 11B.

A mounting shaft 17 for mounting the gas spring 40B in the first arm 11B is arranged on the proximal end side of the first arm 11B.

The gas spring 40B has the same characteristics as a compressive spring. The gas spring 40B includes a cylinder 411, a piston rod 412, an arm mounting hole 413, and a wire mounting hole 414. The cylinder 411 is positioned on the distal end side of the first arm 11B and is filled with gas. The piston rod 412 is inserted into the cylinder 411 and is movable right and left along an extension direction of the first arm 11B. The arm mounting hole 413 is a through-hole arranged through the proximal end side of the piston rod 412. The mounting shaft 17 on the proximal end side of the first arm 11B is inserted into the arm mounting hole 413, and thus the gas spring 40B is mounted on the first arm 11B. The wire mounting hole 414 is a through-hole formed through the distal end side of the gas spring 40B. A wire 50B is inserted into the wire mounting hole 414.

As illustrated in FIG. 14, the wire 50B passes through the wire mounting hole 414 and is folded to cover the entire length of the gas spring 40B, and both end portions are positioned on a second metal plate 14B side. The wire 50B has one end portion, which is further extended toward the second metal plate 14B, comes into contact with the outer peripheral surface 141a of the second metal plate 14B, and is put on the boss 144. In the third embodiment, the wire 50B itself is also formed of an elastic object so as to be capable of following the movement of the gas spring 40B.

In the third embodiment, when the arm portion 10 is folded and the rotary shaft 20 is rotated in the clockwise direction, the wire 50B is rotated in the clockwise direction along the rotary shaft 20 and is pulled toward a second arm 12B. Thus, the gas spring 40B is moved toward the second arm 12B, and therefore torque causing counterclockwise rotation of the second metal plate 14 of the connection portion 15 is repulsively generated on the rotary shaft 20 toward the first arm 11B. Thus, the wire 50B is pulled in the direction of the distal end of the first arm 11 (the direction of an end portion facing away from the rotary shaft 20).

In the third embodiment, the arm mechanism 1B further includes the gas spring 40B, which is provided in the first arm 11B, and the arm mechanism 1B is configured such that the wire 50 is pulled toward the distal end side (an end portion side facing away from the rotary shaft 20) of the first arm 11B by the gas spring 40B. The third embodiment also provides the same effect as the first and second embodiments. In addition, because the gas spring 40B can be used, the arm mechanism 1B is preferably used when, for example, the weight of equipment mounted on the arm mechanism 1B is large and the load exerted on the arm mechanism 1B is large. In addition, because the gas spring 40B has a small spring constant, the variation in torque of pulling the wire 50B is small. Therefore, any variation in torque when the first arm 11B or the second arm 12B is rotated is suppressed, enabling smooth movement.

Fourth Embodiment

Figure 15:
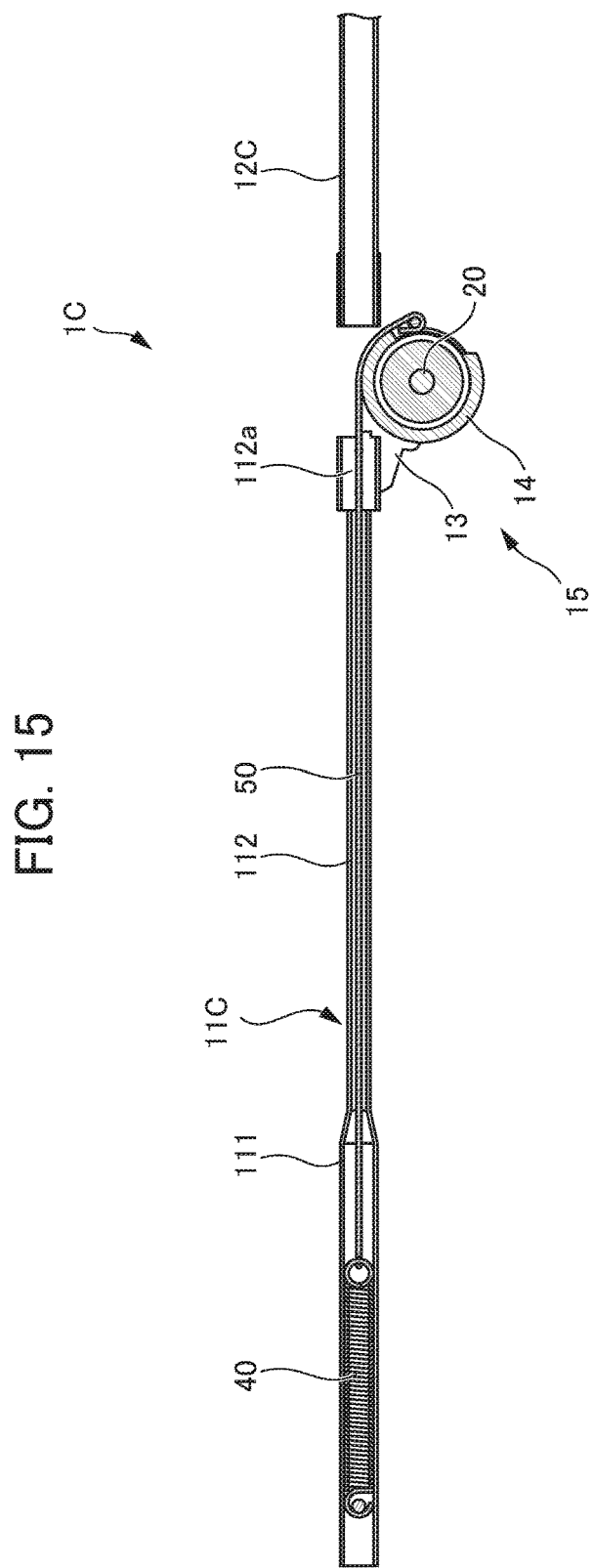
FIG. 15 is a partial cross-sectional view of an arm mechanism according to a fourth embodiment of the present invention.

Next, the fourth embodiment is described. FIG. 15 is a partial cross-sectional view illustrating an arm mechanism 1C according to the fourth embodiment. The arm mechanism 1C according to the fourth embodiment differs from the first embodiment in that the diameter of a first arm 11C is partially reduced.

As illustrated in FIG. 15, the first arm 11C includes a large-diameter portion 111 and a small-diameter portion 112. The large-diameter portion 111 is a cylindrical portion having a length corresponding to the maximum expanded length of the tension spring 40, having an inside diameter slightly greater than the outside diameter of the tension spring 40, and having an interior in which the tension spring 40 is movable in a sliding manner. The small-diameter portion 112 is a cylindrical portion which is coaxial with the large-diameter portion 111, having a diameter smaller than that of the large-diameter portion 111, and having an interior in which the wire 50 can be inserted. The small-diameter portion 112 is extended contiguously from the proximal end side of the large-diameter portion 111. On the small-diameter portion 112 on the proximal end portion side of the first arm 11C, a connection portion mounting portion 112a having a diameter expanded to roughly the same diameter as that of the large-diameter portion 111 is provided. The connection portion mounting portion 112a is mounted on the first metal plate 13, which is connected to the first arm 11C side.

In the fourth embodiment, the first arm 11C includes the large-diameter portion 111 and the small-diameter portion 112. The large-diameter portion 111 has an inside diameter greater than the outside diameter of the tension spring 40 so that the tension spring 40 can be moved in a sliding manner therein. The small-diameter portion 112 is extended from the large-diameter portion 111, has an inside diameter smaller than that of the large-diameter portion 111, and has an interior in which the wire 50 is inserted. Thus, a part of the first arm 11 can be formed to correspond to the diameter of the wire 50, enabling more downsized formation.

Other Embodiment

The present invention is not limited to the aforementioned embodiments, but variations, improvements, and the like within the scope of achievement of the object of the present invention are covered by the present invention. For example, in the aforementioned embodiments, the strut is cited as an example of the support portion 9 of the arm mechanism 1, but the present invention is not limited thereto. The support portion may be a stand or a certain device, and is not particularly limited insofar as the arm mechanism 1 can be set stably. Furthermore, examples of the support portion do not exclude a strut, a stand, or the like, which is provided with casters thereunder or configured to be portable.

In addition, in the aforementioned embodiments, the display or the like is cited as an example of equipment mounted on the arm mechanism 1, but the present invention is not limited thereto. As the equipment to be mounted on the arm mechanism 1, any equipment may be used insofar as it can be used as the position is moved, including a cable and a certain device or tool. The equipment may be used, for example, as a robot arm.

In the aforementioned embodiments, the wire 50 is mounted on the outer peripheral surface 141a of the second metal plate 14. However, the configurations of the first metal plate 13 and the second metal plate 14 are not limited to the above, but the configurations may be interchanged or a different configuration may be used insofar as the first arm 11 and the second arm 12 are connected as the first metal plate 13 and the second metal plate 14 are pivotally supported by the rotary shaft 20.

Although the respective embodiments of the present invention have been explained above, the present invention is not to be limited to the aforementioned respective embodiments, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS

1 arm mechanism
11 first arm
12 second arm
13 first metal plate
14 second metal plate
15 connection portion
20 rotary shaft
30 friction portion
31 friction plate
40 tension spring (biasing member)
40B gas spring (biasing member)
50 wire

What is claimed is:
1. An arm mechanism comprising:
a first arm, the first arm being hollow;
a second arm; and
a connection portion configured to mutually rotatably connect the first arm and the second arm,
the connection portion including:
a rotary shaft extending in a direction perpendicular to an axial direction of the first arm and the second arm;
a friction portion configured to generate a frictional force against rotation of the rotary shaft;
a biasing member configured to be housed in the first arm, the biasing member having an end portion facing away from the rotary shaft and connected to the first arm, the biasing member having an end portion facing the rotary shaft and connected to the second arm via a connection member, the biasing member being configured to generate a contraction force which is increased with an increase in angle between an axis of the second arm and an axis of the first arm by rotation of the rotary shaft; and a first plate and a second plate connected to the first arm and the second arm, respectively, wherein the first and second plates are pivotally supported by the rotary shaft, the friction portion includes a friction plate, and the friction plate is sandwiched by the first plate and the second plate, the friction plate being disposed at the center portion of the cross section of the connection portion.

2. The arm mechanism according to claim 1, wherein the first plate or the second plate has an outer peripheral surface along a circumferential direction of the rotary shaft, and one end portion of the connection member is mounted along the outer peripheral surface.

3. The arm mechanism according to claim 1, wherein the biasing member is a tension spring.

4. The arm mechanism according to claim 1, wherein the first plate, the second plate, and the friction plate are disposed outside the first arm and the second arm.

5. The arm mechanism according to claim 4, wherein the first plate is connected to a first outer peripheral surface of the first arm, and the second plate is connected to a second outer peripheral surface of the second arm, the first and second outer peripheral surfaces being at the end portion facing the rotary shaft.

6. The arm mechanism according to claim 1, wherein an axis of the first arm shifts from an axis of the second arm in a parallel direction.

7. The arm mechanism according to claim 1, shapes of the first and second arms are cylindrical.

8. The arm mechanism according to claim 4, wherein the first plate or the second plate has an outer peripheral surface along a circumferential direction of the rotary shaft, and one end portion of the connection member is mounted along the outer peripheral surface.

9. The arm mechanism according to claim 4, wherein the biasing member is a tension spring.

10. The arm mechanism according to claim 4, wherein an axis of the first arm shifts from an axis of the second arm in a parallel direction.

11. The arm mechanism according to claim 4, shapes of the first and second arms are cylindrical.

12. An arm mechanism comprising:
a first arm, the first arm being hollow;
a second arm; and
a connection portion configured to mutually rotatably connect the first arm and the second arm,
the connection portion including:
a rotary shaft extending in a direction perpendicular to an axial direction of the first arm and the second arm;
a friction portion configured to generate a frictional force against rotation of the rotary shaft;
a biasing member configured to be housed in the first arm, the biasing member having an end portion facing the rotary shaft and connected to the first arm, the biasing member having an end portion facing away from the rotary shaft and connected to the second arm via a connection member, the biasing member being configured to generate a force for pulling the connection member toward an end portion of the first arm facing away from the rotary shaft by the biasing member, by an increase in angle between an axis of the second arm and an axis of the first arm by rotation of the rotary shaft; and a first plate and a second plate connected to the first arm and the second arm, respectively, wherein the first and second plates are pivotally supported by the rotary shaft, the friction portion includes a friction plate, and the friction plate is sandwiched by the first plate and the second plate, the friction plate being disposed at the center portion of the cross section of the connection portion.

13. The arm mechanism according to claim 12, wherein the biasing member is a gas spring.

14. The arm mechanism according to claim 12, wherein the first plate or the second plate has an outer peripheral surface along a circumferential direction of the rotary shaft, and one end portion of the connection member is mounted along the outer peripheral surface.

15. The arm mechanism according to claim 12, wherein the first plate, the second plate, and the friction plate are disposed outside the first arm and the second arm.

16. The arm mechanism according to claim 15, wherein the first plate is connected to a first outer peripheral surface of the first arm, and the second plate is connected to a second outer peripheral surface of the second arm, the first and second outer peripheral surfaces being at the end portion facing the rotary shaft.

17. The arm mechanism according to claim 12, wherein an axis of the first arm shifts from an axis of the second arm in a parallel direction.

18. The arm mechanism according to claim 15, wherein the first plate or the second plate has an outer peripheral surface along a circumferential direction of the rotary shaft, and one end portion of the connection member is mounted along the outer peripheral surface.

19. The arm mechanism according to claim 15, wherein an axis of the first arm shifts from an axis of the second arm in a parallel direction.

* * * * *